United States Patent [19]
Sutter et al.

[11] 3,946,986
[45] Mar. 30, 1976

[54] FLOW REGULATING VALVE

[75] Inventors: Jean Georges Sutter, Villers-Les-Nancy; Jean Pierre Depoisson, Pont-A-Mousson, both of France

[73] Assignee: Pont-A-Mousson S. A., Nancy, France

[22] Filed: June 12, 1974

[21] Appl. No.: 478,496

[30] Foreign Application Priority Data
June 15, 1973 France .............................. 73.21849
May 27, 1974 France .............................. 74.18258

[52] U.S. Cl. ............................... 251/298; 251/304
[51] Int. Cl.² ........................................ F16K 31/528
[58] Field of Search ........... 251/315, 304, 305, 192, 251/162, 333, 298, 299, 303; 137/527, 527.8

[56] References Cited
UNITED STATES PATENTS
270,353    1/1883    Waddell ........................ 251/357 X
1,856,138  5/1932    Ruemelin ........................ 251/298
2,196,503  4/1940    McFee ......................... 251/298 X
3,539,147  11/1970   Paul, Jr. ....................... 251/304 X
3,726,308  4/1973    Eberhardt ..................... 251/298 X Primary Examiner—Martin P. Schwadron
Assistant Examiner—Robert J. Miller
Attorney, Agent, or Firm—Sughrue, Rothwell, Mion, Zinn & Macpeak

[57] ABSTRACT

A flow regulating valve comprising a body of revolution provided with an inner annular seat and a closure member cooperative with the seat and having a spherical valving surface and movable in the body by an element mounted in the body to rotate about an axis which extends through the closure member and is perpendicular to the axis of the body and offset relative to the axis of the body. The element is connected to rotate with the closure member. The latter has the shape of two domes united on their limit circles which are located in a plane parallel to the seat in the valve closing position of the closure member.

20 Claims, 15 Drawing Figures

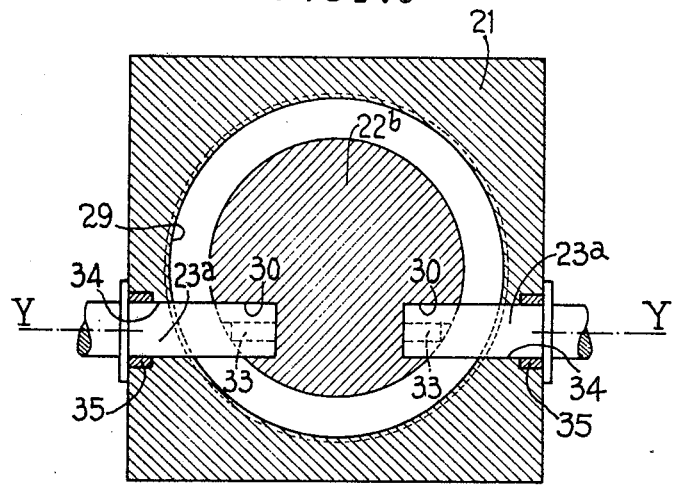
FIG_10
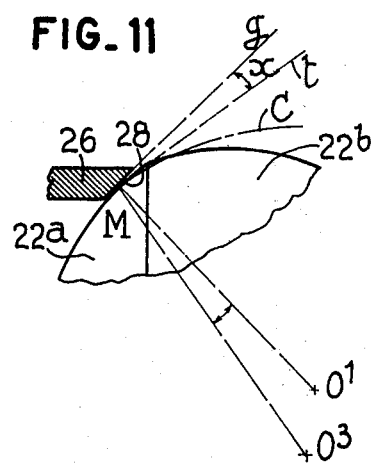
FIG_11
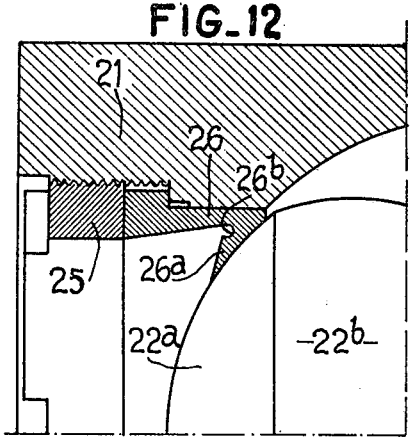
FIG_12
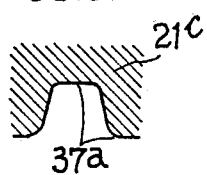
FIG_13a
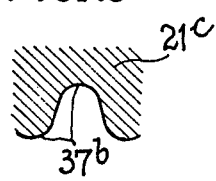
FIG_13b
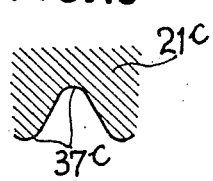
FIG_13c

FLOW REGULATING VALVE

The present invention relates to fluid flow regulating valves and more precisely to valves of the type comprising a body of revolution provided with an inner annular seat and a closure member having a spherical valving surface and movable in the body by actuating means between a valve closing position in which it cooperates with the seat and at least one valve opening position. Such valves are applicable to the regulation of the flow of fluids.

Valves of this type are known which present to the fluid a constant spherical valving or effective surface of the closure member and an annular fluid passage when the closure member is in the valve opening position. However, these valves have several drawbacks: they employ complicated means for guiding the closure member and for pivotally connecting the latter to the actuating means; this actuating means is outside the closure member and therefore subjected, together with the pivoting means, to the attack of the fluid (furring and/or corrosion); for pivoting the actuating means to the closure member the latter is in the shape of a truncated sphere and this irregular shape of the closure member, together with the presence in the path of the fluid of the guiding, pivoting means and actuating means, creates in the flow of the fluid important disturbances, above all when the pressure of the fluid is high, which may produce a cavitation phenomenon.

An object of the present invention is to overcome these drawbacks and to provide a valve of the aforementioned type which is simple in construction, small in overall size and considerably reduces the disturbance of the flow of the fluid and the risk of deterioration of the actuating means by the fluid while it affords to the fluid a constant spherical valving surface on the closure member and an annular passage for the fluid when the closure member is in the valve opening position.

According to the invention, there is provided a valve of the aforementioned type wherein the closure member has the shape of two spherical domes, united on their limiting circles, which are located in a plane parallel to the seat in the valve closing position of the closure member, and the actuating means comprises an element mounted in the body to rotate about an axis which extends through the closure member and is perpendicular to, but offset from, the axis of the body, said element being connected to rotate with the closure member.

In a first embodiment of the invention, the closure member has the shape of a sphere.

In a second embodiment of the invention, which still further improves the flow characteristics of the valve and reduces the valve-actuating torque required, that one of the spherical domes which is adapted to bear against the seat in the valve closing position of the closure member has a radius of curvature exceeding the radius of curvature of the other dome through which said axis extends.

Advantageously, when the valve is closed, the various points of the closure member which are to come in contact with the seat approach the seat at an angle which varies between a minimum of about 10° and a maximum of about 20°. There is consequently but little risk of the closure member jamming on the seat, the sealing between the closure member and the seat is good and the regulation of the flow is precise at small valve openings.

Embodiments of the invention will now be described by way of example in the ensuing description with reference to the accompanying drawings in which:

FIG. 10 is a view to a reduced scale taken on line 10—10 of FIG. 9;

FIG. 11 shows a detail of this valve;

FIG. 12 is a view of a modification of the seat for this valve, and

FIGS. 13a to 13c are diagrammatic views of a detail of modifications of this valve.

Figure 1:
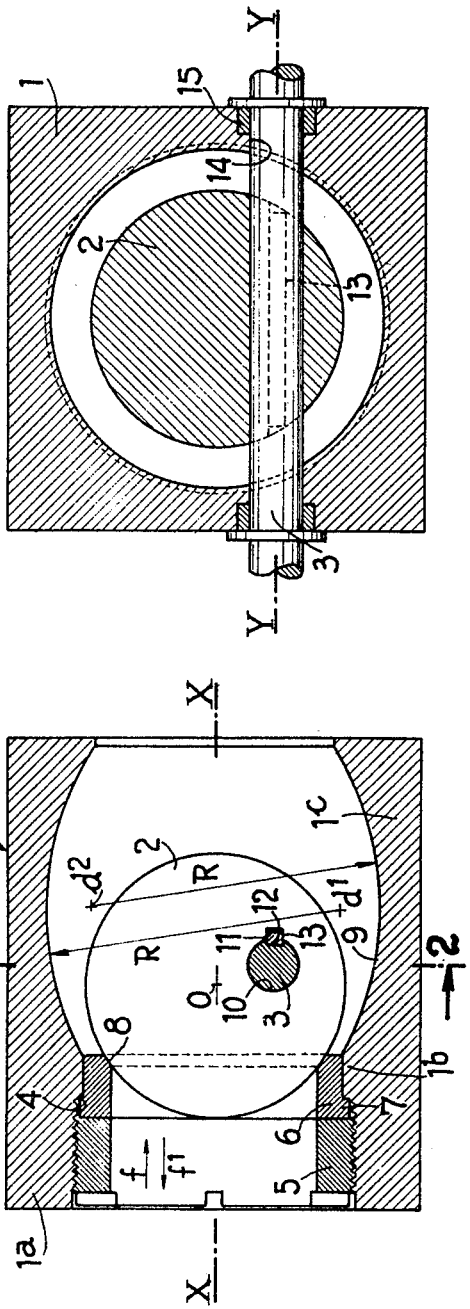
FIG. 1 is an axial sectional view of one embodiment of a valve according to the invention, in the closed position of the valve.

The valve shown in FIG. 1 comprises a body 1 of revolution having an axis X-X, a closure member 2 and an actuating spindle 3. The direction of flow of the fluid is shown by arrow $f$.

The body 1 has a tapped cylindrical upstream portion $1a$ having a shoulder 4 and a cylindrical portion $1b$ which is smooth and has a smaller diameter. In the latter there is secured by a screwthreaded ring 5 a tubular seat 6 having an axis X-X and provided with an upstream flange 7 which abuts the shoulder 4. This seat has at the end thereof remote from the flange 7, a roughly frustoconical bearing surface 8 against which the closure member 2 bears in a sealing manner when it is in the valve closing position.

The body 1 further comprises a downstream portion $1c$ having a barrel-shaped smooth inner wall or surface 9. The meridian of the wall 9 is defined by two halves of a circle having a radius R and centres $d^1$ and $d^2$.

Figure 2:
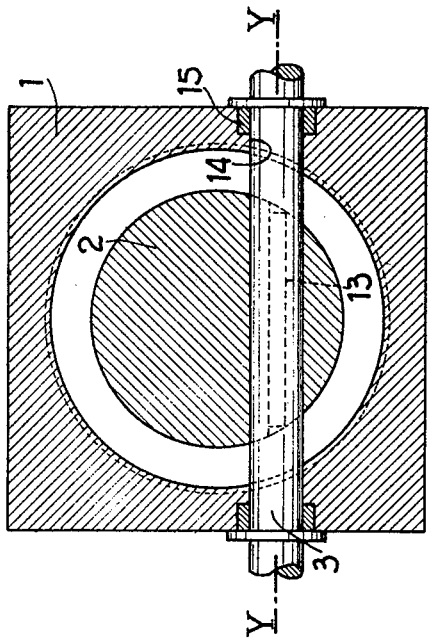
FIG. 2 is a sectional view taken on line 2—2 of FIG. 1.
Figure 3:
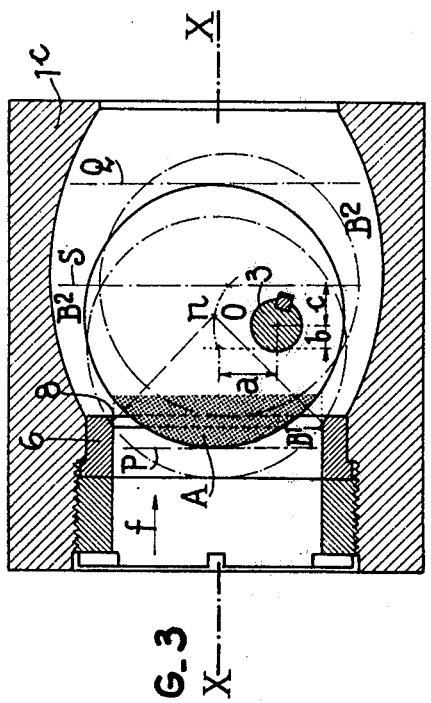
FIG. 3 is a view similar to FIG. 1 of the valve in its open position.

The closure member 2, contained for the major part in the downstream portion $1c$ of the body, is a sphere having a centre 0 and is provided with an eccentric bore 10 having a groove 11 which allows the passage through this sphere of the cylindrical actuating spindle 3 which is provided with a groove 12 and a key 13. As can be seen in FIG. 2, this spindle 3 also extends through bores 14 formed in the walls 9 of the body 1 and allows the provision of sealing elements 15. The common axis Y-Y of the bores 14 and the shaft 3 is orthogonal to the axis X-X and offset a distance $a$ from the latter, offset a distance $b$ in the downstream direction from the diametral plane of the closure member 2 perpendicular to the axis X-X when the closure member is in the valve closing position, and offset a distance $c$ in the upstream direction from the maximum transverse section S of the downstream portion $1c$ of the tubular body 1 (FIG. 3).

Figure 4:
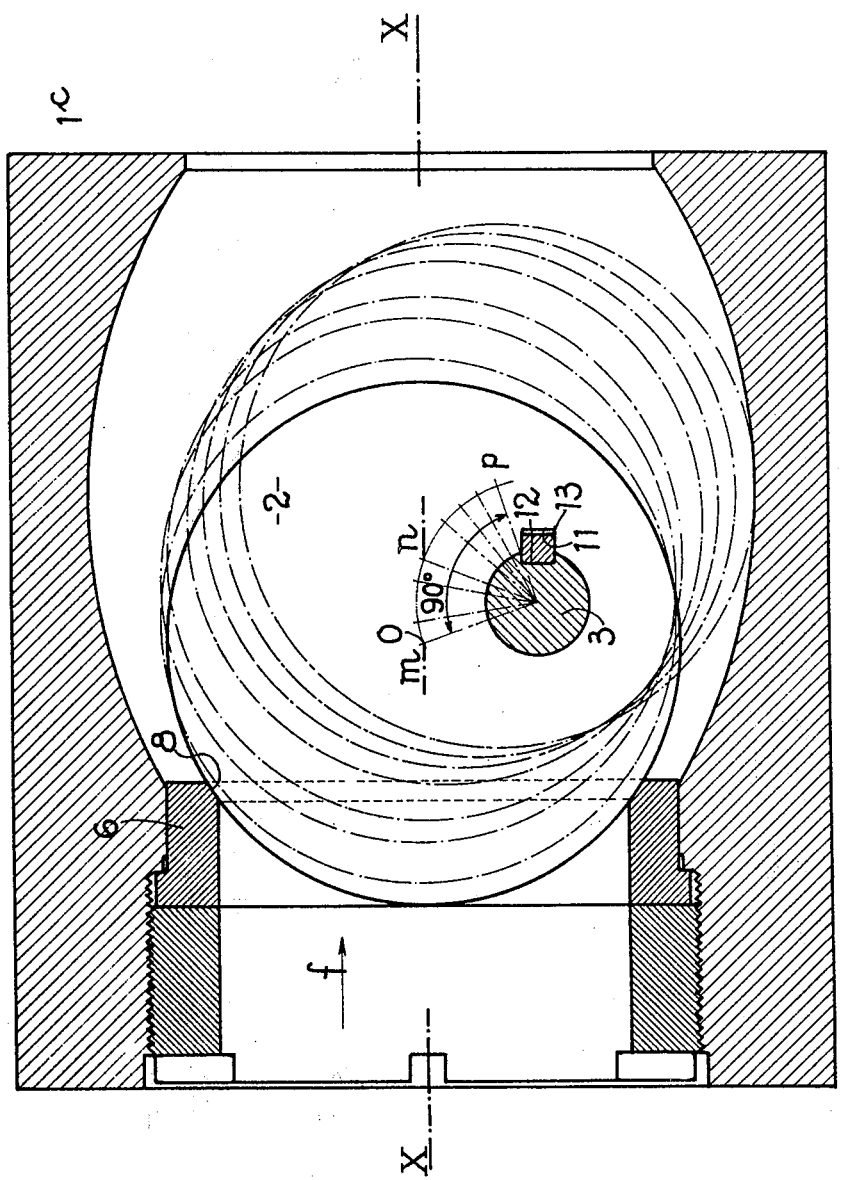
FIG. 4 is a sectional view similar to FIGS. 1 and 3 to an enlarged scale of the valve showing different positions of the closure member.

The spindle 3, connected to rotate with the closure member 2 by the key 13, can be moved from outside the valve by any means (not shown), for example by a crank so as to cause the closure member to assume, depending on its angular position, a valve closing position (FIG. 1) or any one of the valve opening positions shown in dot-dash lines in FIG. 4. The rotation of the spindle 3 between the valve closing position of the closure member and its position of maximum valve opening is 90°. In the course of this rotation, the centre 0 of the closure member describes an arc of $m\ n\ p$. Thus, it can be seen that, irrespective of its position, the closure member 2 presents to the fluid a constant valving or effective surface which is a spherical dome A, shown by crosshatching in FIG. 3, and a downstream profile which is also constant and spherical.

As can be seen in FIG. 4, owing to the suitably eccentric position of the spindle 3 with respect to the closure member 2 and to the tubular body 1 (offsets $a$, $b$, $c$), rotations of the spindle 3 through angles within the angle subtended at the centre by the arc $m\ n$ (points $m$ and $n$ located on the axis X-X) and even through slightly greater angles, shifts the centre 0 of the closure member 2 along an arc of a circle very close to the axis X-X and which may be in practice assimilated to this axis. Therefore, for such rotation of the spindle 3, the closure member 2 moves substantially in translation along the axis X-X and away from or toward the seat 6 with no need to employ rectilinear guide means. This is a considerable simplification and, moreover, the well-sheltered disposition of the spindle 3 with respect to the fluid, which eliminates risk of deterioration by furring or chemical attack, constitutes an appreciable advantage.

Similarly, the effective or valving surface A of the closure member 2 remains constant, the section of passage of the fluid defined between the bearing surface 8 and the closure member 2 is annular and varies in an almost linear manner for a displacement $m\ n$, or even a little more, of the centre 0 of the closure member. Thus, the regulation of the flow of the fluid is very easy.

On the other hand, for a rotation of the centre 0 corresponding to the arc $n\ p$, the closure member 2 comes in contact with the inner wall 9 of the downstream portion 1c of the tubular body 1 and the deviation of the closure member from the axis X-X is distinctly noticeable. The valve then allows through a large flow of fluid, but the flow is much less regular. The optimal position of utilisation of this valve is therefore that shown in FIG. 3 in full line in which the centre 0 of the closure member is at $n$.

In the course of rotation through 90° of the spindle 3 in the different positions of the closure member 2 shown in dot-dash lines in FIG. 4, the annular section of passage between the body 1 and this closure member is convergent in the zone $B^1$ between the upstream plane P perpendicular to the axis X-X and tangent to the closure member and the cone whose base is the bearing surface 8 of the tubular seat 6 and whose apex is the centre 0 of the closure member 2, and divergent in the zone $B^2$ between this cone and the downstream plane Q perpendicular to the axis X-X and tangent to the closure member 2 (FIG. 3). Thus, at no moment does the fluid encounter an obstacle or a change in level perpendicular to its direction $f$ of movement. On the contrary, it flows through an annular passage having a convergent-divergent shape which is extremely favourable to a good flow without cavitation, or in any case with minimum risk of cavitation.

Note that owing to the judicious eccentric disposition of the spindle 3 (offsets $a$, $b$, $c$), the abutment of the closure member against the surface 8 of the seat 6 occurs with the minimum of friction since when the valve is closed, the displacement of the centre 0 of the closure member along an arc $n\ m$, terminating at $m$, is practically axial.

Figure 5:
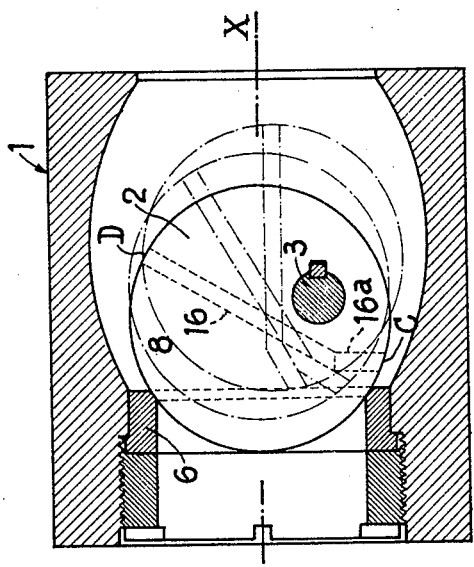
FIG. 5 is an axial sectional view of a first modification of the valve.

The modification of the valve shown in FIG. 5 differs from the previously described embodiment in that, instead of having a rigid seat acting as a bearing surface for the closure member, the seat 6 has a downstream portion 6a of a flexible plastics or elastic material defining a bearing surface which ensures a very good seal in the valve closing position without wedging force.

Figure 6:
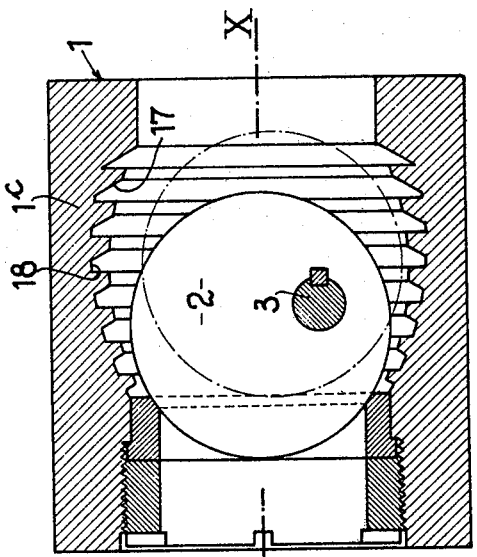
FIG. 6 is a view similar to FIG. 5 of a second modification of the valve.

The modification of the valve shown in FIG. 6 differs from that shown in FIG. 5 in that instead of having a seat fixed in the body 1 the valve has a floating seat 14 of rigid material, for example of metallic or plastics material, which is fixed in the body 1 by a tubular bellows 15 having an axis X-X. When the closure member comes in contact with the seat 14 in the valve closing position, this seat 14 centres itself on the spherical closure member. This centering and sealing of the device are improved by the upstream pressure effect of the fluid on the bellows 15.

Figure 7:
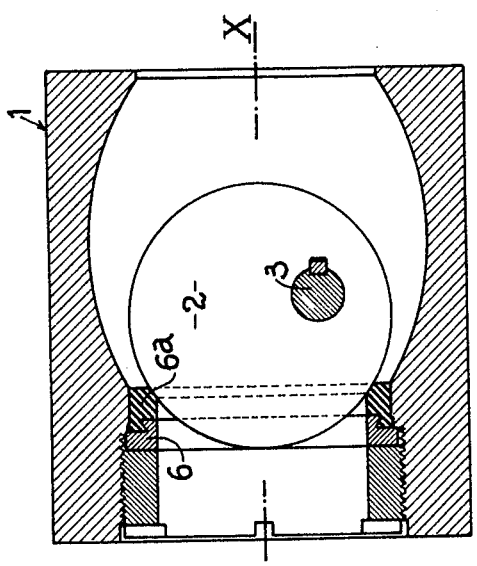
FIG. 7 is a sectional view of a third modification of the valve.

However, when the difference between the upstream pressure and the downstream pressure is high, the foregoing embodiments have risks of cavitation. In order to reduce these risks, the closure member 2 of the modification shown in FIG. 7 has extending therethrough at least one upstream-downstream connecting conduit 16. When the closure member is in the valve closing position, the conduit 16 joins a point C on its surface downstream of the bearing surface 8 of the seat 6 to a point D roughly diametrically opposite. The presence of the conduit 16 therefore does not prevent a sealed closure. On the other hand, when the valve is opened, the point D is in the vicinity of the axis X-X and the conduit 16 connects the high-pressure upstream region of the valve to the lower-pressure downstream region. In this way, the effect of vaporization behind the closure member may be reduced and therefore the cavitation. The conduit 16 may be straight or cranked as shown in FIG. 7, it having a cranked portion 16a making an obtuse angle with the rest of the conduit 16.

Figure 8:
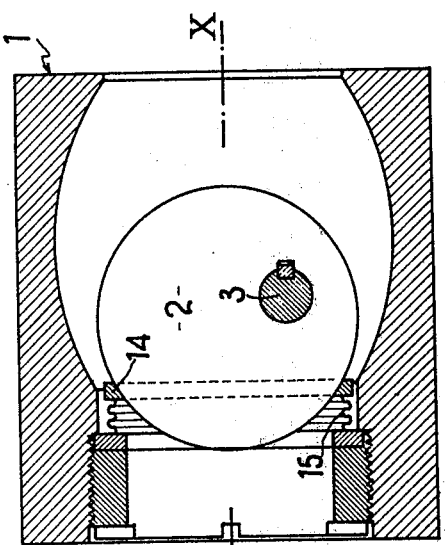
FIG. 8 is a sectional view of a fourth modification of the valve.

In the modification of the valve shown in FIG. 8, instead of having a smooth surface, the inner wall of the downstream portion 1c of the body 1 has inner annular projections or ribs 17 having an axis X-X which have, for example, in the same way as the groove 18 therebetween, a trapezoidal profile. This modification which is also of interest in the case of high pressure drop between the upstream and downstream sides, enables the total pressure drop to be split up into a plurality of lower pressure drops in the region of each projection or rib 17, these ribs reducing the section of passage of the fluid. Consequently, the multiplicity of the ribs 17 limits the risk of cavitation and moreover noise.

Note that the valve, except in the case of the modification shown in FIG. 6 having a floating seat, may operate in both directions of flow, the flow being either in the direction of arrow $f$ or in the opposite direction $f^1$, the seat 2 being in the latter case downstream of the closure member instead of upstream thereof (FIG. 1).

Figure 9:
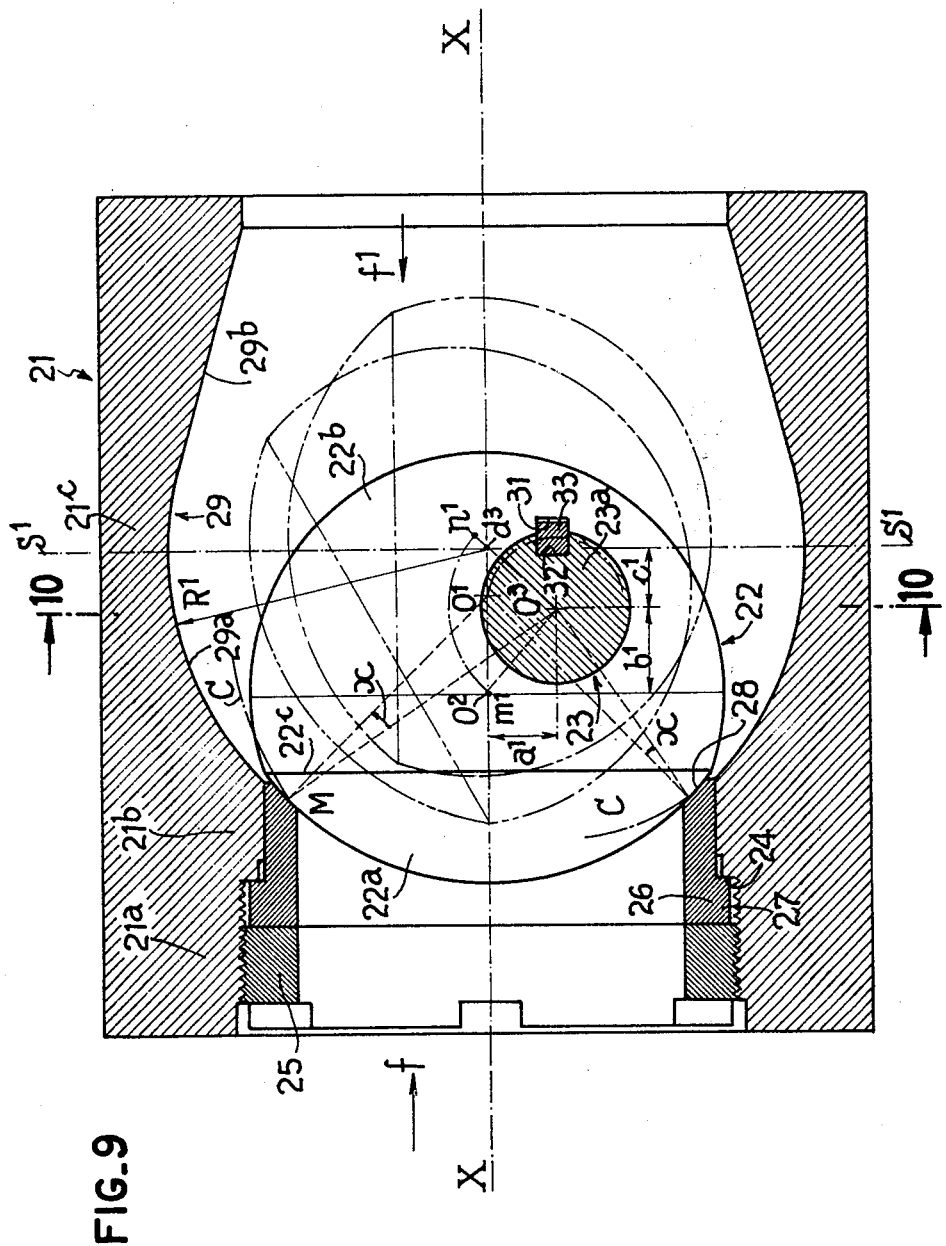
FIG. 9 is an axial sectional view of a valve according to another embodiment of the invention.

The valve shown in FIG. 9 comprises a body 21 of revolution having an axis X-X, a closure member 22 and an actuating spindle or shaft 23. The direction of flow of the fluid is that shown by arrow $f$.

The body 21 has an upstream tapped cylindrical portion 21a defining a shoulder 24 and a smooth cylindrical portion 21b of smaller diameter in which is secured by means of a screwthreaded ring 25 a tubular seat 26 having an axis X-X and provided with an upstream flange 27 which abuts the shoulder 24. This seat has at the end thereof remote from the flange 27 a bearing surface 28 which is roughly frustoconical, its half angle at the centre being about 45°, against which surface the closure member 32 bears in a sealing manner when it is in the valve closing position.

The body 21 also has a downstream portion 21c having a smooth inner wall or surface 29 The wall 29 is generated by the rotation about the axis X-X of a curve constituted by an arc of a circle 29a having a radius $R^1$ and centre $d^3$ extended in the downstream direction by a rectilinear segment 29b tangent thereto. The wall 29 is thus constituted by a portion of a sphere extended by a convergent truncated cone.

The closure member 22, for the major part contained in the downstream portion 21c of the body, comprises two spherical domes 22a, 22b which are interconnected along a common circle 22c, for example by one or more screws (not shown). The dome 22a has a radius slightly greater than the other dome and its volume is less than one half of the volume of the sphere of which it forms part. The other dome 22b has a radius slightly less than the diameter of the pipe in which the valve is intended to be mounted and a volume exceeding one hallf of the volume of the sphere of which it forms part. As can be seen in FIG. 10, this dome 22b has two coaxial blind apertures 30 which are parallel to the plane of the circle 22c. Each aperture 30 is provided with a longitudinal groove 31 formed in the wall of the aperture. The centres of the domes 22a and 22b have been designated respectively by the references $0^1$ and $0^2$ in FIG. 9.

The actuating spindle or shaft 23 is constituted by two half spindles or journals 23a each of which is provided with a groove 32 and engaged in a blind aperture or bore 30 in the closure member. These journals and the closure member are interconnected by a key 33. Each of the journals 23a also extends through a bore 34 formed in the wall 29 of the body 1 with room for a sealing element 35. The common axis Y-Y of the bores 34 and consequently the axis of the shaft 33 is orthogonal to the axis X-X and offset a distance $a^1$ from this axis, offset a distance $b^1$ downstream of the diametral plane of the dome 22b perpendicular to the axis X-X when the closure member is the valve closing position, and offset a distance $c^1$ in the upstream direction from the maximum cross section $S^1$ of the downstream portion 21c of the tubular body 21 (FIG. 9).

The journals 23a connected to rotate with the closure member 22 about the axis Y-Y (centre of rotation $0^3$ in the plane of FIG. 9) by the key 33, can be rotated from the exterior by any means (not shown) for example a crank, so as to cause the closure member to assume, in accordance with its angular position, a valve closing position or any valve opening position, two of these positions, corresponding to rotations of the journals 23a through 60° and 90°, being shown in dot-dash lines in FIG. 9. The rotation of the journals 23a between the valve closing position of the closure member and its maximum valve opening position is 90°. In the course of this rotation the centre 0 of the closure member describes an arc of a circle $m^1n^1$ centred on the axis Y-Y.

Owing to the suitably eccentric position of the actuating spindle 23 with respect to the closure member 22 and to the tubular body 21 (offset distances $a^1$, $b^1$, $c^1$, $d^1$), the rotation of the spindle 23 causes the centre $0^2$ of the dome 22b to move along an arc of a circle which is very near to the axis X-X and may be in practice assimilated to this axis. Consequently, the closure member 22 practically moves in translation along the axis X-X in moving away from or toward the seat 26 and the flow section between the closure member and the body remains substantially annular with the axis X-X. This is still further ensured by the asymmetrical shape of the closure member.

When the valve is closed, the upstream dome 22a comes in contact with the conical bearing surface 28 of the seat 26 and this contact occurs on an annular region of the dome 22a near to the circle 22c and parallel to the plane of the latter.

FIG. 11 shows the detail of the contact of the dome 22a with the conical bearing surface of the seat 26 in the plane of FIG. 9. The point of contact m of the closure member describes, in the course of the opening and closing movements of the latter, a curve C whose tangent at the point of contact with the seat is the straight line Mt.

As the locus of the point m is a circle centered at $0^3$ on the axis Y-Y, the line Mt is the tangent to this circle at the point of contact. The angle that this line Mt makes in the plane of the section with the tangent Mg at M to the seat 26 is designated by the reference $x$ and defines the angle at which the dome 22a approaches the seat when the valve is closed. Elementary geometric considerations shown that in the plane of FIG. 9 the angle $x$ is equal to the angle made by the straight lines joining the considered point of contact M to the centre $0^1$ of the dome 22a and to the centre of rotation $0^3$ (FIG. 11). The position of the centre of rotation $0^3$ relative to the centre $0^1$ of the dome 22a is chosen in such manner that the angles $x$ on each side of the axis X-X are equal (FIG. 9). This is true irrespective of the section plane perpendicular to the axis Y-Y.

When the section plane and therefore the considered point of contact varies while remaining perpendicular to the axis Y-Y, the angle $x$ increases from a minimum value in the neighbourhood of 10° to a maximum value in the neighbourhood of 20° in the region of the journals.

Further, it will be understood that two points of contact M which are symmetrical relative to the plane of symmetry of the valve (plane of FIG. 9) define equal angles $x$.

The angle $x$ has a practical signification, since it defines the shape of the section of passage of the fluid just before complete closure of the valve. If this angle is too small, there is risk of wedging of the closure member on the seat when closing the valve, which results in jamming and wear of the latter. On the other hand, if the angle $x$ is too large, the actuating torque required is too high. Experience has shown that the minimum value of $x$ defined hereinbefore permitted both a good little-disturbed flow, in the almost closed position of the valve, a good seal in the closing position and, when this closing position is reached, a considerable sweeping caused by the fluid between the closure member and the seat which permits the expulsion of the solid particles which would be liable to deteriorate this seat and adversely affect the seal. Further, with such a minimum angle x, the regulation of the flow is precise at small openings.

The modification just described has, in addition to the advantages just mentioned, the following advantages over the embodiments described hereinbefore: for an aqual flow, the actuating torque required is lower. The overall volume of the different positions of the closure member is reduced, which permits a reduction in the axial distance between the end faces of the body 21. Further, the shape of the inner surface or wall 29 of this body improves the flow characteristics of the valve.

The seat shown partly in FIG. 12 has an annular bead or lip portion 26a which faces in the upstream direction and is substantially conical. When the closure member is in the valve closing position, the upstream pressure of the fluid applies this lip portion against the dome 22a, which results in an additional self-sealing. An annular recess 26b provided at the junction between the lip portion 26a and the seat 26 decreases the thickness of the base region of the lip portion and increases its elasticity.

If it is intended to use the valve in both directions of flow (arrows f and f¹), the seat may have a second similar portion on the upstream side relative to the direction of flow f¹. This additional lip portion has not been shown in the drawing.

In the emodiment described with reference to FIG. 8, the inner wall or surface of the downstream part 1c of the body 1 has inner annular projecting portions having an axis X-X which have a trapezoidal section in the same way as the recesses therebetween. Such recesses and projecting portions limit the risk of cavitation and flow noise. FIGS. 13a, 13b and 13c show three advantageous sections for these projecting portions which promote the flow: a section 37a which is trapezoidal or roughly square with rounded corners (FIG. 13a), a curvilinear section 37b (FIG. 13b) and a rounded triangular section 37c (FIG. 13c).

Having now described our invention what we claim as new and desire to secure by Letters Patent is:

1. In a flow regulating valve of the type comprising a body defining an inner chamber of revolution having an axis of revolution and provided with an inner annular seat having a general plane which is perpendicular to said axis and a closure member which has a substantially spherical valving surface and is movable in the body by actuating means between a valve closing position in which the closure member cooperates with the seat and at least one valve opening position, the following features: the closure member has the shape of two spherical domes, united on circular peripheries thereof in a plane which is parallel to the general plane of the seat in the valve closing position of the closure member, and the actuating means comprises an element mounted in the body to rotate about a second axis which extends through a first one of said domes and is perpendicular to, but offset from, said axis of revolution, said element being rigidly connected to rotate with said first one of said domes.

2. A valve as claimed in claim 1, wherein the closure member has the shape of a sphere.

3. A valve as claimed in claim 1, wherein the closure member is in one piece.

4. A valve as claimed in claim 1, wherein the distance between said second axis and the general plane of the seat exceeds the distance between the general plane of the seat and a plane which is perpendicular to the axis of revolution of the chamber and contains the center of said first one of said domes when the closure member is in the valve closing position.

5. A valve as claimed in claim 1, wherein said element is a spindle which extends throughout said first one of said domes and is keyed to said first one of said domes.

6. A valve as claimed in claim 1, wherein the body has an inner surface of such shape that the passage for the fluid, when the closure member is in a valve opening position, is substantially annular and has a section which decreases and then increases in the direction of flow of the fluid.

7. A valve as claimed in claim 6, wherein the inner chamber is barrel-shaped.

8. A valve as claimed in claim 6, wherein the body has an inner surface which has, starting from an end of the body adjacent the seat, the shape of a portion of a sphere extended by a convergent frustoconical portion which is tangent to the spherical portion of the inner surface of the body.

9. A valve as claimed in claim 1, wherein the closure member defines a conduit which extends through the closure member and joins two points of the closure member which are substantially diametrally opposed and located on the same side of the seat when the closure member is in the valve closing position.

10. A valve as claimed in claim 9, wherein the conduit is on the whole rectilinear and has a short part bent at an obtuse angle.

11. A valve as claimed in claim 1, wherein a second one of said domes has a radius exceeding the radius of said first one of said domes.

12. A valve as claimed in claim 1, wherein the two domes are two interconnected distinct parts.

13. A valve as claimed in claim 1, wherein said element comprises two coaxial journals keyed in blind apertures of the closure member.

14. A valve as claimed in claim 1, wherein a second one of said domes is adapted to come in contact with the seat on an annular region of said second one of said domes, said region being comprised of points which, when the valve is being closed, simultaneously approach the seat at an angle which varies between a minimum of about 10° and a maximum of about 20° throughout the periphery of said region.

15. A valve as claimed in claim 1, wherein the seat has at least one annular sealing lip portion capable of being applied by the fluid upstream of the seat against the closure member in the valve closing position of the closure member.

16. In a flow regulating valve of the type comprising a body defining an inner chamber of revolution having an axis of revolution and provided with an inner annular seat having a general plane which is perpendicular to said axis and a closure member which has a substantially spherical valving surface and is movable in the body by actuating means between a valve closing position in which the closure member cooperates with the seat and at least one valve opening position, the following features: the closure member has the shape of two spherical domes, united on circular peripheries thereof in a plane which is parallel to the general plane of the seat in the valve closing position of the closure member; the actuating means comprises an element mounted in the body to rotate about a second axis which extends through a first one of said domes and is perpendicular to, but offset from, said axis of revolution, said element being rigidly connected to rotate with said first one of said domes; and the body has an inner surface defining inner annular projecting portions coaxial with said axis of revolution.

17. A valve as claimed in claim 1, wherein the projecting portions and recesses interposed between the projecting portions have a trapezoidal cross-sectional shape.

18. A valve as claimed in claim 16, wherein the projecting portions and recesses interposed between the projecting portions have a substantially square cross-sectional shape with rounded corners.

19. A valve as claimed in claim 16, wherein the projecting portions and recesses interposed between the projecting portions have a curvilinear cross-sectional shape.

20. a valve as claimed in claim 16, wherein the projecting portions and recesses interposed between the projecting portions have a triangular cross-sectional shape with rounded corners.

* * * * *